United States Patent
Ignaczak et al.

(10) Patent No.: US 7,410,192 B2
(45) Date of Patent: Aug. 12, 2008

(54) RIBBED PIPE CLAMP WITH SEALING SLEEVE

(75) Inventors: Brian T. Ignaczak, Rochester, MI (US); Michael E. Amedure, Lake Orion, MI (US); Alan Polaski, Waterford, MI (US); Kevin Lee, Bloomfield Township, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 54 days.

(21) Appl. No.: 11/136,749

(22) Filed: May 25, 2005

(65) Prior Publication Data

US 2005/0264012 A1    Dec. 1, 2005

Related U.S. Application Data

(60) Provisional application No. 60/574,339, filed on May 25, 2004.

(51) Int. Cl.
*F16L 21/02* (2006.01)
*F16L 17/00* (2006.01)
*F16L 33/22* (2006.01)

(52) U.S. Cl. .................. 285/373; 285/397; 285/398; 285/419; 285/420; 24/279; 24/20 R

(58) Field of Classification Search .............. 285/420, 285/397, 398, 419, 373; 24/282, 279, 280, 24/20 L, 20 R
See application file for complete search history.

(56) References Cited

U.S. PATENT DOCUMENTS

| 2,227,551 | A | * | 1/1941 | Morris ..................... 285/373 |
| 3,004,781 | A | * | 10/1961 | Morris ..................... 285/369 |
| 4,142,743 | A | * | 3/1979 | McGowen et al. ..... 285/148.26 |
| 4,380,348 | A | * | 4/1983 | Swartz ..................... 285/236 |
| 4,473,246 | A | * | 9/1984 | McDowell ............... 285/373 |
| 4,813,720 | A | * | 3/1989 | Cassel .................... 285/419 |
| 5,116,083 | A | * | 5/1992 | Gillingham et al. ......... 285/23 |
| 6,877,780 | B2 | * | 4/2005 | Potts et al. ............... 285/420 |
| 2002/0014772 | A1 | * | 2/2002 | Amedure et al. ........... 385/373 |
| 2004/0216284 | A1 | * | 11/2004 | Belisle et al. ............... 24/279 |

* cited by examiner

*Primary Examiner*—James M Hewitt
*Assistant Examiner*—Jay R Ripley
(74) *Attorney, Agent, or Firm*—Reising, Ethington, Barnes, Kisselle, P.C.

(57) ABSTRACT

A pipe coupler for use in connecting a pair of automotive exhaust pipe ends each having a circumferential rib. The pipe coupler includes a ribbed band and internal split sealing sleeve along with a tightening mechanism for clamping the band and sleeve over the pipe ends. The sealing sleeve fits within the band and both the sleeve and band have a pair of ribs positioned to fit over the ribs on the pipe ends. The sleeve extends circumferentially from a first end to a second end, and includes a tongue-and-groove sealing configuration located axially inwardly of the ribs at the first and second ends. Each tongue has a particular construction that accommodates larger clamp opening dimensions required to fit the coupler over the pipe ribs during assembly. The sleeve can include inwardly protruding sealing beads that help prevent leakage of exhaust gases from the pipe junction.

7 Claims, 4 Drawing Sheets

RIBBED PIPE CLAMP WITH SEALING SLEEVE

CROSS-REFERENCE TO RELATED APPLICATION

This application claims the priority of U.S. Provisional Application No. 60/574,339, filed May 25, 2004, the entire contents of which are hereby incorporated by reference.

FIELD OF THE INVENTION

This invention relates generally to pipe clamps and, more specifically, to both band clamps and pipe couplers used for connecting pipes or other tubular members together either telescopically or in an end-to-end configuration.

BACKGROUND OF THE INVENTION

A typical vehicle exhaust system includes an assembly of tubes, or pipes, that provide transport of engine exhaust gases. Each individual pipe section is connected to another pipe section to form a complete exhaust system assembly. Such connections are usually either telescopic or as an end-to-end abutting connection. To be effective, the connection formed between these pipes should provide a suitable fluid-tight seal against exhaust gas leakage. The connection should also have a high degree of mechanical strength and be capable of being disassembled for possible maintenance and repair.

Pipe couplers are often used for exhaust systems where the pipe sections are axially joined in an end-to-end configuration. A conventional pipe coupler includes a band having a generally circular conformation and terminating in opposing connecting flanges that can be drawn together or loosened via a fastener or other tightening mechanism. A reaction member can be provided between the flanges to help provide an even distribution of circumferential forces on the pipes as the band is tightened. Often, the pipe coupler will include an internal split sealing sleeve with mating circumferential ends that engage each other during tightening to produce a gas-tight seal. U.S. application Publication No. 2002/0014772 A1 published Feb. 7, 2002 (now U.S. Pat. No. 6,758,501 to Amedure et al.) is an example of such a pipe coupler having a split sealing sleeve, and the entire contents of that published application are hereby incorporated by reference.

In the Amedure patent, each tongue of the split sealing sleeve shown in FIGS. 3-7 comprises a pair of spring members that during tightening engage converging side edges of their associated groove with the spring members being deflected inwardly towards each other as they are forced farther into the groove. The outward force of the spring arms against the angled side edges of the groove maintain good contact with the groove side edges to provide a seal against gas leakage. In this Amedure patent, the tongue-and-groove mating portions are located towards the axial extents of the sleeve. In particular, the center of each tongue-and-groove mating portion is spaced in from its nearest axial end of the sealing sleeve by a distance of about 17-22% of the total axial width of the sleeve.

Ribbed band clamps that were originally designed for catalytic converters and diesel particulate filters having diameters much larger than typical automotive exhaust pipes are shown and described in U.S. patent application Publication No. 2003/0015872 A1 published Jan. 23, 2003 (now U.S. Pat. No. 6,877,780 to Potts et al.), the entire contents of which are hereby incorporated by reference. The ribs of the band clamp engage corresponding beads or ribs of the exhaust system canisters (or other tubular bodies) being joined to provide the joint with good strength against tensile (pull-apart) forces. For protection against gas leakage, one of the disclosed clamps uses a gasket along with a version of the tongue-and-groove sealing structure from Amedure's patent in which the circumferential ends of the band itself have a tongue-and-groove mating structure located within ribs of a separate pair of strap sections that are provided as a part of the tightening mechanism.

Although the band clamps of the Potts patent can be used for exhaust component canisters and smaller diameter pipes as well, the inventors have found that the design of the band clamps disclosed in the Potts patent do not provide a sufficiently strong and gas-tight connection for certain automotive exhaust applications. Similarly, although the pipe coupler of the Amedure patent is suitable for many automotive applications, there continues to be a demand within the automotive industry to develop pipe couplers that offer increased performance in terms of pull-apart strength, gas tightness, and/or various other parameters.

SUMMARY OF THE INVENTION

The present invention is directed to a pipe clamp such as a coupler for connecting two abutting pipe ends together. The pipe clamp includes a ribbed band and internal split sealing sleeve along with a tightening mechanism for clamping the band and sleeve over the pipe ends. The band has a body portion and a pair of opposed flanges extending radially from the body portion, with the body portion extending circumferentially from a first one of the flanges to a second one of the flanges. The band has a first pair of radially outwardly protruding spaced ribs extending circumferentially at least part way along the body portion. The split sealing sleeve has first and second ends, and the sleeve extends circumferentially within the band from its first end to its second end. The sleeve includes a second pair of spaced ribs extending at least part way between the first and second ends with each of the second pair of ribs protruding radially into an associated one of the first pair of ribs. The first and second ends comprise mating ends having a tongue-and-groove sealing configuration in which the first end includes a pair of spaced tongues and the second end includes a pair of spaced grooves each axially aligned with one of the tongues. Preferably, the ribs are located axially outwardly of the tongue-and-groove sealing configuration so that the tongues and grooves are located along a radially flat portion of the sleeve.

DETAILED DESCRIPTION OF THE PREFERRED EMBODIMENTS

Figure 1:
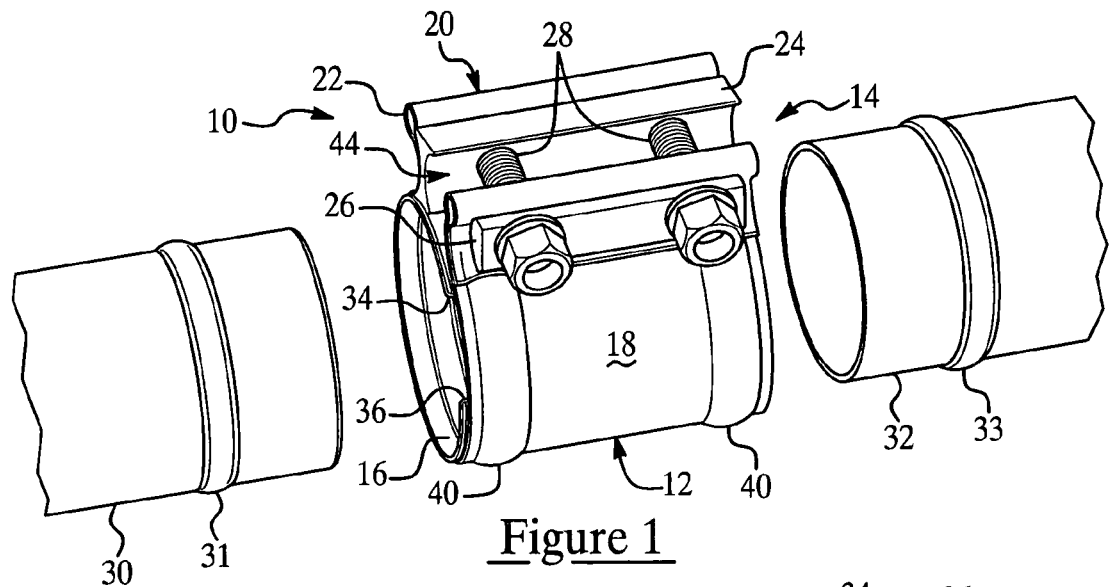
FIG. 1 is a perspective view of a pair of ribbed pipe ends along with a pipe coupler constructed in accordance with the present invention.

In the drawings there are shown various embodiments of the invention each in the form of a pipe coupler especially adapted for use in automotive engine exhaust systems. It will be appreciated as the description proceeds that the invention is useful in many different applications and in a wide variety of embodiments. For example, the invention can be used not only for pipe couplers that permit connecting ribbed pipes in an end-to-end configuration, but also for band clamps that are typically clamped over a pair of telescopically-connected pipes. As used herein, the term "pipe clamp" is used to refer to both pipe couplers and band clamps. Furthermore, the terms axially, angularly, and radially refer to directions relative to the circular (roundish) shape of the illustrated pipes and pipe coupler, so that the axial direction extends along the axis of this roundish shape, radial directions extend radially away from this axis, and angularly refers to locations at points around the circumference of the pipe coupler.

Figure 2:
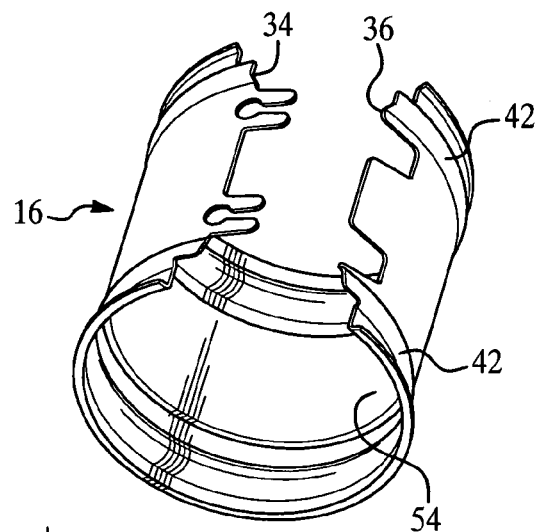
FIG. 2 is a perspective view of a first embodiment of a split sealing sleeve used in the pipe coupler of FIG. 1.

As shown in FIGS. 1 and 2, the illustrated pipe coupler 10 includes a band 12, tightening mechanism 14, and split sealing sleeve 16. The band 12 is an open band that includes a cylindrical body portion 18 and a pair of opposing flanges 20 that extend from the body portion 18 to loops 22 at the radially outward-most portion of the flanges. The flanges 20 include abutment surfaces which, during tightening of the band, engage opposite sides of a reaction member 24 located therebetween. The tightening mechanism 14 comprises the reaction member 24 and a force bar 26 along with a pair of nut and bolt fasteners 28 that pass through apertures in the flanges, reaction member, and force bar. The bolts can be headed with elongated half-rounds as is known and shown at 28 in FIG. 5 Any of the tightening mechanisms discussed in the above-noted U.S. Pat. Nos. 6,758,501 and 6,877,780 can be used, and the reaction member can be press-fit onto a spline of the fasteners 28, as described in U.S. Pat. No. 4,813,720. It will be appreciated by those skilled in the art that other tightening mechanisms can be used, including those which do not utilize a reaction member.

The coupler 10 is adapter for use with pipe ends 30, 32 that each include a radially outwardly protruding circumferential rib 31, 33, respectively. These ribs 31, 33 are located axially inwardly from the end face of each pipe end by a distance sufficient to allow the two pipe ends to be brought into abutting contact within the coupler 10 so that the sealing sleeve 16 can then be tightly collapsed in good sealing contact against both pipe ends in the space between the two ribs 31, 33. Preferably, the ribs 31, 33 protrude radially by about 2-3 mm and have an axial width of about 5-10 mm. Where a telescopic lap joint is used, the ribs 31, 33 can be positioned on their respective pipes so that the clamp extends over one rib on the lapped section of the connection and onto and over the other rib at an untapped section of the smaller diameter pipe end. A stepped clamp arrangement such as is disclosed in U.S. Pat. No. 4,261,600 to Cassel can be used.

With continued referenced to FIGS. 1 and 2, the split sealing sleeve 16 is located radially within the band 12 and includes a pair of mating circumferential ends 34, 36 that engage each other during tightening of the band 12 to help provide a gas-tight seal of the coupler 10 over the pipe ends. At each axial end of the band 12 is a single rib 40 that extends circumferentially around the body portion 18 of the band. These ribs 40 terminate at the flanges 20. The sealing sleeve 16 also has a corresponding rib 42 at each of its axial ends and these ribs 42 are dimensioned and positioned axially such that they fit into the ribs 40 of the band 12. Preferably, the ribs 42 are shaped to conform closely to the inner surface of the corresponding ribs 40 of the band. These ribs 40, 42 of each component are also shaped and spaced from one another so that the inner surface of the ribs 42 of the sealing sleeve 16 mate with and closely conform to the ribs 31, 33 on the ends of the two pipes when the pipe ends 30, 32 are brought together into abutting axial alignment. As indicated in FIG. 1, the mating ends 34, 36 of the sealing sleeve are angularly offset from an opening 44 in the band 12 at the flanges 20 to thereby increase the gas-tightness of the seal when the pipe coupler is tightened.

Figure 3:
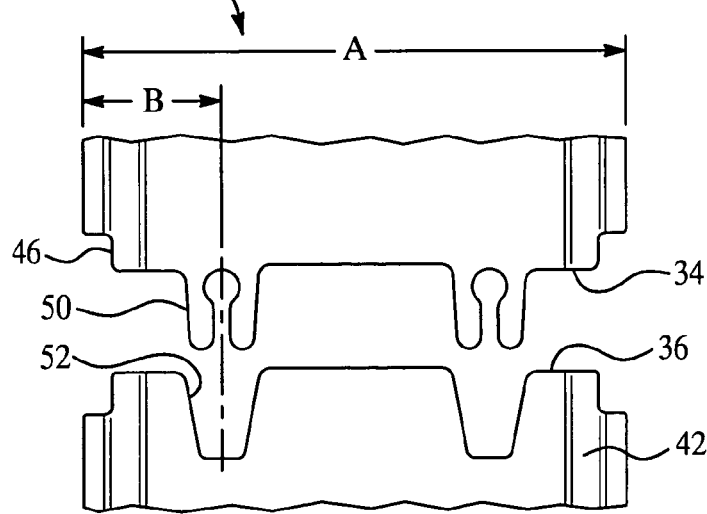
FIG. 3 is a fragmentary view of the mating ends of the split sealing sleeve of FIG. 2.

As shown in FIGS. 2 and 3, the split sealing sleeve 16 can have a tongue-and-groove mating configuration as disclosed in FIGS. 3-7 of U.S. Pat. No. 6,758,501 to Amedure et al. As more fully detailed in the Amedure patent, each tongue 50 has a central slot which forms a pair of spring members that engage the angled side walls of the groove 52 as the tongue is forced into the groove during tightening of the coupler. The resilience of the spring members maintains tight contact between the outer side edges of each tongue 50 and the inner side edges of its associated groove to prevent gas leakage along the interface of the two ends 34, 36. The tongue-and-groove mating portions are axially located between the ribs 42 along a radially flat portion of the sleeve, meaning that they are located at a portion of the sleeve that does not include any inward or outward radial protrusions. The tongue-and-groove mating portions are spaced from their nearest axial end by one-fourth the total width A of the sleeve. More specifically, the axial center of each tongue and groove is spaced from the nearest axial end of the sleeve by a distance of B, wherein B is about one-fourth of A. This location enables the use of an outer axial portion of the sleeve for the ribs 42, yet provides sufficient axial separation of the tongue-and-groove mating portion from the central region where the pipe ends meet to help minimize the amount of gas leakage from the pipes.

As is also shown in FIG. 3, the outer extents of the mating ends 34, 36 of the sleeve 16 can be recessed in a stepped fashion, as shown at 46, with this step 46 occurring at the rib 42 itself. Alternatively, in the second embodiment shown in FIGS. 4 and 5, the step 48 can occur axially between the ribs 42. Because of the interference fit of the tongues 50 into the grooves 52, there is no need for the ends 34, 36 to abut each other at or outside of the ribs. This can be seen in FIG. 5 wherein the clamp has been partially tightened causing each tongue 50 to enter its associated groove 52 and engage the angled side edges of each groove 52. Further tightening of the clamp will then cause the spring members of each tongue 50 to deflect inwardly, resulting in a tight, double metal-to-metal connection between the sleeve ends on each side of the pipe junction. Other sealing configurations can be used. For example, the mating configuration disclosed in FIGS. 8 and 9 of U.S. Pat. No. 6,758,501 can be used in lieu of or in addition to that shown in FIGS. 2-5.

Figure 4:
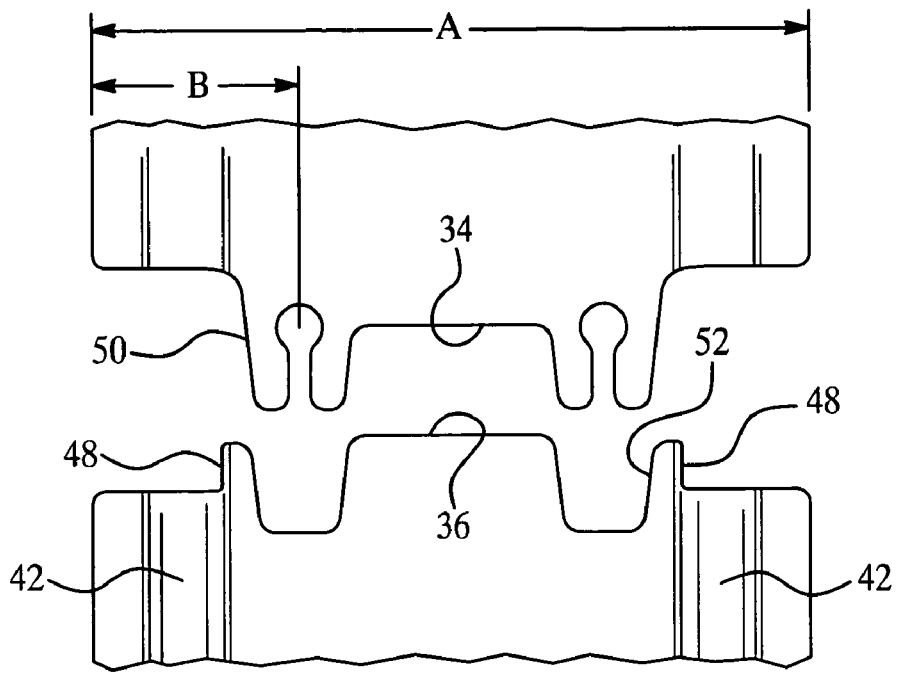
FIG. 4 is a fragmentary view of the mating ends of a second embodiment of the split sealing sleeve.
Figure 5:
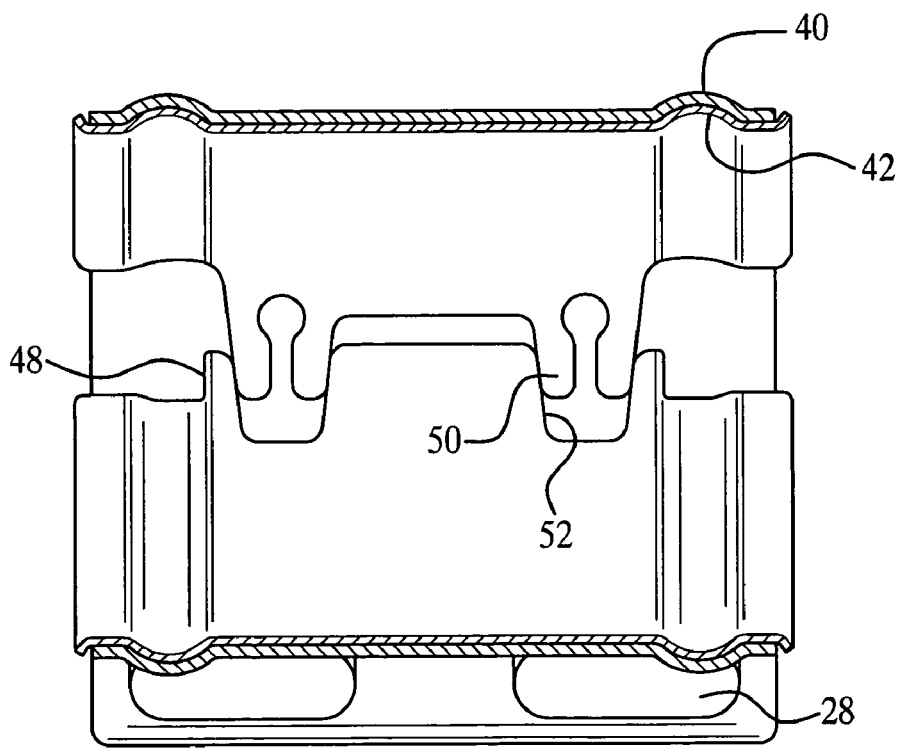
FIG. 5 is a cross-sectional view taken along a cut line that extends axially through the pipe coupler of FIG. 1 and showing the second embodiment of the split sealing sleeve.

In conjunction with positioning the step 48 further inwardly, the embodiment of FIGS. 4 and 5 also include an axial repositioning of the tongue-and-groove mating portions.

In this embodiment, the tongues 50 and grooves 52 have been located further inwardly such that the spacing B of the axial center of each tongue and groove from the end of the sleeve is about equal to 28% of the total width A of the sleeve.

Although sealing sleeve 16 will in most applications be suitable to provide the desired amount of sealing against leakage from the pipe junction, an internal gasket 54 can be used to provide additional sealing for low leak applications. This optional component is shown in FIG. 2. The gasket 54 can be positioned in the central region of the sealing sleeve and can extend circumferentially, terminating somewhat short of the mating ends 34, 36, as indicated in FIG. 2, or can extend all the way to the mating ends or even partially beyond one or both mating ends, as discussed in the Potts patent. Furthermore, the gasket can extend axially up to the ribs 42 or extend partially or fully into the ribs, as disclosed in the Potts patent.

Figures 6, 7:
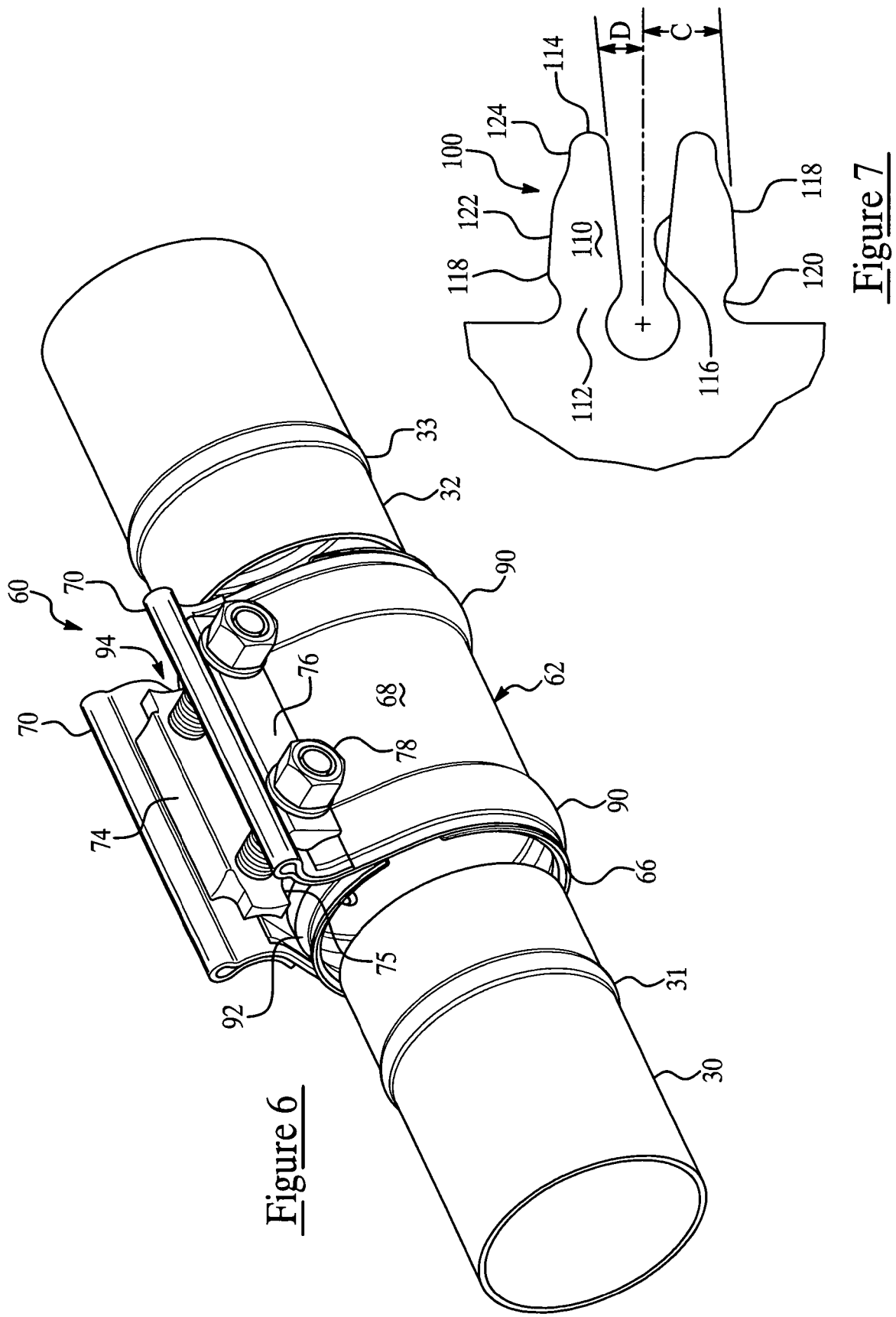
FIG. 6 is a perspective view of a pair of ribbed pipe ends along with another embodiment of a pipe coupler constructed in accordance with the present invention.
FIG. 7 is an enlarged, fragmentary view of one of the tongues used in the split sealing sleeve of the coupler of FIG. 6.
Figure 8:
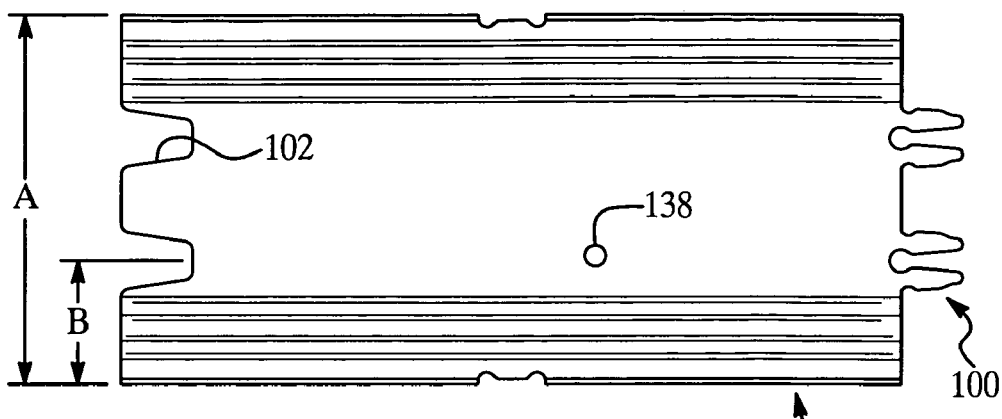
FIG. 8 is a plan view of the split sealing sleeve used in the coupler of FIG. 6 prior to forming it into a cylindrical shape.

Referring now to FIGS. 6-8, a third embodiment is shown. This embodiment is substantially the same as the first two embodiments with the exception of several notable features which are discussed below. Thus, the reference numbers used for elements of this embodiment are offset by 50 from like elements of the first embodiment. As in the first two embodiments, the coupler 60 of FIG. 6 includes a band 62, tightening mechanism 64, and split sealing sleeve 66. The band 62 includes a body portion 68 and a pair of opposed flanges 70 that are formed as unitary extensions of body portion 68. The tightening mechanism includes a reaction member 74, force bar 76, and a pair of fasteners 78 that allow tightening of the coupler by drawing the two flanges 70 together. The pipes 30, 32 are the same as in FIG. 1, including their respective radially-protruding ribs 31, 33. The band 62 and sleeve 66 each include a pair of respective ribs 90, 92.

As best seen in FIG. 6, the axial width of the ribs 90 and 92 is significantly greater than that of the ribs 31, 33 of the pipes. Since the connection of the ribs is not relied upon for gas-tightness of the pipe junction, this increased width of the ribs 90, 92 accommodates a certain degree of axial tolerance in both the pipe insertion during assembly and in the location of the ribs 31, 33 themselves relative to the end faces of the pipes. This helps prevent misalignments of the ribs during assembly and helps eliminates the need for matching of pipes and couplers due to manufacturing tolerances in the positioning of the ribs. For pipe ribs having about 2-3 mm of radial protrusion and an axial width of 5-10 mm, the rib 92 of the sealing sleeve 66 can have a radial protrusion of that same 2-3 mm, but with a width of at least 10 mm and preferably less than 20 mm. In a highly preferred embodiment, a width of about 15 mm is used. The rib 90 of the band 62 has a radial protrusion and width selected to closely conform to the outer surface of the rib 92.

The band 62 has an opening 94 located between the flanges 70. The mating ends of the split sealing sleeve 66 are angularly offset from this opening 94 so that the ribs 92 span the opening. In the first embodiment, the reaction member 24 extends the entire width of the opening 44 and, as such, sits on or above the ribs 42 such that the reaction member 24 is not in contact with the sealing sleeve 16 at the central region located between the ribs. In this third embodiment, the reaction member 74 is notched on the bottom at its axial ends as shown at 75 which provides clearance for the ribs 92 and allows the reaction member 74 to contact the radially flat section of the sealing sleeve 66 located between the ribs 92. This helps maintain a uniform, radially-inward force on the sleeve 66 at all points about its circumference. The notches can be provided at all four corners of the reaction block so that it can be assembled to the flanges in any of the four possible orientations.

As shown in FIGS. 7-8, the sealing sleeve 66 uses a tongue-and-groove sealing configuration which, in comparison to that of the first two embodiments, involves a longer tongue and groove as well as a different tongue design. The grooves 102 are similar to that of grooves 52, in that both have inner side edges that converge towards each other at an angle of about 18°; however, the grooves 102 have a depth of about one and a half to two times the depth of grooves 52. In one preferred embodiment, the grooves 102 have a depth of about 18 mm. The tongues 100 are best shown in FIG. 7 and include a pair of spring members 110 each formed as a unitary extension from the end of sleeve 66. The spring members 110 each extend from a distal end 112 to a free end 114, and each includes an inner side edge 116 and an outer side edge 118. The spring members 110 each have a length in the range of 10-20 mm and preferably about 15 mm. The extended length of the tongues and grooves is advantageous since the ribs 31, 33 on the pipe ends can require that the coupler be opened to a greater extent during assembly. The longer tongue 100 helps insure proper initial alignment of the tongue into the groove 102 at the point at which the clamp is closed enough to attach the nuts onto the bolts of the fastener 78.

At the distal end 112, the spring members 110 have a radiused undercut 120 at the outer side edge 118. This undercut allows the relatively long spring member to have a certain minimum width (e.g., 2.5-3 mm) at its free end 114 while maintaining angled side edges that engage and mate with the inner side edges of the grooves 102 without having a distal end that is too wide to permit proper inward deflection of the spring members as they penetrate into the groove. The outer side edge 118 of the spring members 110 has a compound contour that includes a first portion 122 and a second, recessed portion 124 located at the free end 114. The recessed portion 124 of side edge 118 helps with the initial engagement of the tongue into the groove even if the sleeve is cocked by a small amount. The distended portion 122 provides structural integrity to the spring member at its midsection and provides a properly positioned and angled edge for mating with the inner side edge of the groove 102 to thereby cause the desired amount of contact and inward deflection of the spring member during tightening of the clamp. Preferably, the first section 122 of the outer side edge 118 is substantially straight and forms an angle C of about 4°-5° relative to the centerline of the tongue. Thus, the two edges of each tongue 100 at the midsection 122 form a convergence angle of about 8-9°. The inner side edge 116 of each spring member 110 forms a diverging angle D with the centerline of about 6° so that the two inner side edges 116 diverge at an angle of about 12°. These angles are for the spring members 110 in their initial, undeformed state prior to forceful insertion into the grooves.

With particular reference now to FIG. 8, the axial location of the tongues 100 and grooves 102 are farther inward than that of the first two embodiments. For the sleeve 66, the distance B to the nearest axial end is about one-third the total length A. This position can be moved outwardly towards that utilized in the first two embodiments, as long as it does not create significant overlap with the ribs 92, and can be moved axially inwardly up to about the point at which B equals two-fifths of A. Thus, based on these three embodiments, the length B is within a range of values that satisfies the relationship:

$$\frac{A}{4} \le B \le \frac{2A}{5}$$

Figure 9:
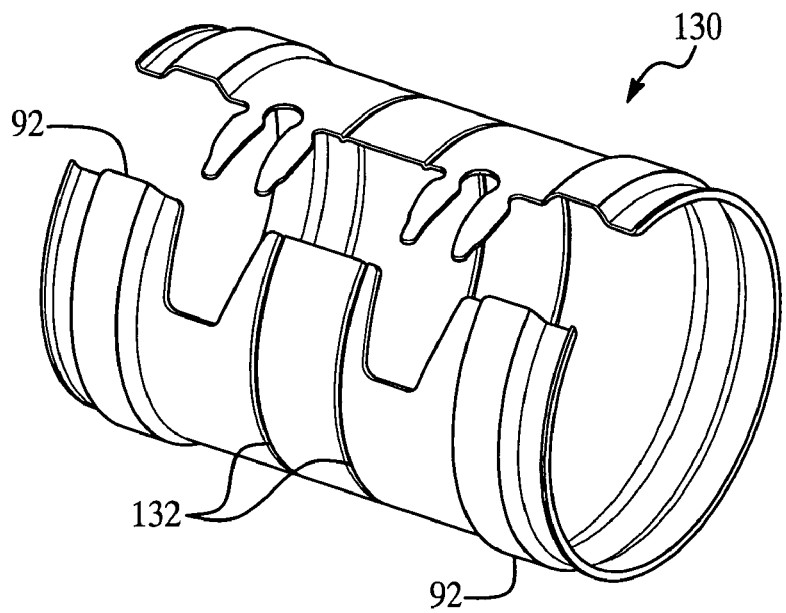
FIG. 9 is a perspective view of a fourth embodiment of a split sealing sleeve that includes a pair of inwardly-protruding sealing beads located between the tongue-and-groove mating portions.
Figure 10:
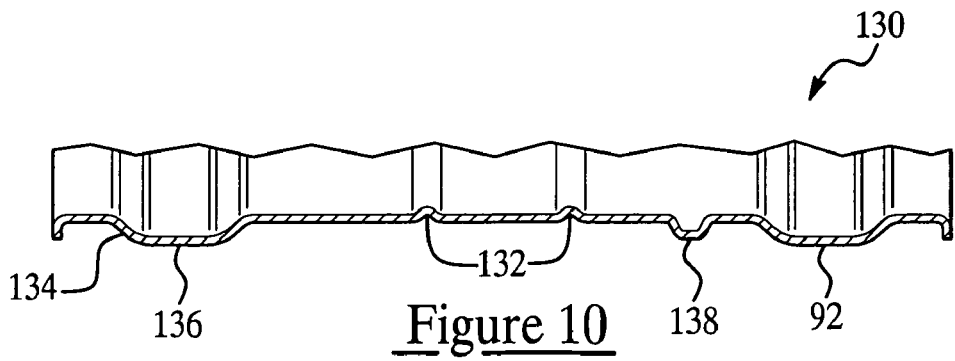
FIG. 10 is a partial cross-sectional view of the split sealing sleeve of FIG. 9 showing the relative position and dimensions of the ribs and sealing beads.

Turning now to FIGS. 9 and 10, a fourth embodiment is shown which can be identical to the third embodiment of FIGS. 6-8, except for the sealing sleeve 130 which is the only component shown in these two figures. In this embodiment, the sleeve 130 has a pair of inwardly-protruding sealing beads 132. These sealing beads 132 extend radially inwardly at a location intermediate the two tongue-and-groove mating portions to help insure a gas-tight seal about the pipe junction. Thus, the tongues and grooves are located on a radially flat portion of the sleeve 130 at an axial position that is between the sealing beads 132 and ribs 92. During tightening of the clamp, the sealing beads 132 are forced against the outer surface of the pipe ends on either side of the pipe junction and, with suitable tightening, will deform to some degree. Preferably, the sealing beads 132 protrude inwardly by about 0.3-0.5 mm and have an axial width of about 0.5-1 mm. In the cross-section of FIG. 10, it can be seen that the widened ribs 92 are not semi-circular in shape, but rather have a pair of angled sidewalls 134 that extend from a radially flat section of the sleeve to a substantially flat outer wall 136, although it will of course be appreciated that other cross-sectional shapes could be used for the ribs. The small detent 138 shown in FIG. 10 is an alignment detent that is used in a known manner to mate with a small aperture in the outer band 62 so as to set and maintain the relative angular positions of the sleeve 66 and band 62 during assembly.

It will thus be apparent that there has been provided in accordance with the present invention a pipe clamp which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, the ribs in the pipes and coupler need not extend about the entire circumference of the components, but for only a portion thereof, or can be discontinuous at one or more angular positions. Also, although the shape of the band and sealing sleeve of the embodiments has been shown and described as cylindrical, it is not necessary that the cylindrical shape be circular or even a point-wise continuous curved; rather, it need only be in the general shape of an open loop. All such variations and modifications are intended to come within the scope of the appended claims.

As used in this specification and appended claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe clamp for connecting two pipe ends, comprising:
a band having a body portion and a pair of opposed flanges extending radially from said body portion, said body portion extending circumferentially from a first one of said flanges to a second one of said flanges, said band including a first pair of radially outwardly protruding spaced ribs extending circumferentially at least part way along said body portion;
a split sealing sleeve having first and second ends and extending circumferentially within said band from said first end to said second end, said sleeve including a second pair of spaced ribs extending at least part way between said first and second ends with each of said second pair of ribs protruding radially into one of said first pair of ribs, said first and second ends comprising mating ends having a tongue-and-groove sealing configuration in which said first end includes a pair of spaced tongues and said second end includes a pair of spaced grooves each axially aligned with one of said tongues, wherein each of said grooves have a pair of angled side edges and each of said tongues comprise a pair of spring members each having an outer side edge positioned to engage a corresponding one of the side edges of its associated groove, and wherein said outer side edge of at least one of said spring members of each tongue has a compound contour including a first portion at a midsection of said spring member and a second, recessed portion at a free end of said spring member; and
a tightening mechanism connected to said band and comprising at least one fastener connected to said flanges to draw said flanges toward each other to thereby tighten said pipe clamp over the pipe ends and force said mating ends of said sleeve together into sealing engagement.

2. A pipe clamp as defined in claim 1, wherein each said spring member has said compound outer side edge and wherein said outer side edges of each spring member at said first portion have a convergence angle of about 8-9° and said angled side edges of said grooves have a convergence angle of about 18°.

3. A pipe clamp as defined in claim 1, wherein each said spring member has an inner side edge and wherein said inner side edges of each tongue diverge at an angle of about 12°.

4. A pipe clamp as defined in claim 1, wherein each said spring member having said compound outer side edge has a length in the range of 10-20 mm.

5. A pipe clamp as defined in claim 4, wherein each said spring member having said compound outer side edge has a length of about 15 mm.

6. A pipe clamp for connecting two pipe ends, comprising:
a band having a body portion and a pair of opposed flanges extending radially from said body portion, said body portion extending circumferentially from a first one of said flanges to a second one of said flanges, said band including a first pair of radially outwardly protruding spaced ribs extending circumferentially at least part way along said body portion;
a split sealing sleeve having first and second ends and extending circumferentially within said band from said first end to said second end, said sleeve including a second pair of spaced ribs extending at least part way between said first and second ends with each of said second pair of ribs protruding radially into one of said first pair of ribs, said first and second ends comprising mating ends having a tongue-and-groove sealing configuration in which said first end includes a pair of spaced tongues and said second end includes a pair of spaced grooves each axially aligned with one of said tongues, wherein said split sealing sleeve includes a pair of inwardly-protruding sealing beads axially located between said grooves; and a tightening mechanism connected to said band and comprising at least one fastener connected to said flanges to draw said flanges toward each other to thereby tighten said pipe clamp over the pipe ends and force said mating ends of said sleeve together into sealing engagement.

7. A pipe clamp defined in claim 6, wherein said sealing beads protrude by about 0.3-0.5 mm and have an axial width of about 0.5-1 mm.

* * * * *